(12) United States Patent
Nienaber et al.

(10) Patent No.: US 11,097,398 B2
(45) Date of Patent: Aug. 24, 2021

(54) ABRASIVE ARTICLE AND METHOD OF MAKING THE SAME

(71) Applicant: 3M INNOVATIVE PROPERTIES COMPANY, St. Paul, MN (US)

(72) Inventors: Aaron K. Nienaber, Maplewood, MN (US); Thomas J. Nelson, Woodbury, MN (US); Grayce T. Huberty, St. Paul, MN (US); Louis S. Moren, Oakdale, MN (US); Wayne W. Maurer, Lakeville, MN (US); Rebecca A. Putans, Midland, MI (US); Ernest L. Thurber, Somerset, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 213 days.

(21) Appl. No.: 16/337,446

(22) PCT Filed: Sep. 25, 2017

(86) PCT No.: PCT/US2017/053168
§ 371 (c)(1),
(2) Date: Mar. 28, 2019

(87) PCT Pub. No.: WO2018/063960
PCT Pub. Date: Apr. 5, 2018

(65) Prior Publication Data
US 2019/0344402 A1  Nov. 14, 2019

Related U.S. Application Data

(60) Provisional application No. 62/402,546, filed on Sep. 30, 2016.

(51) Int. Cl.
*B24D 11/00* (2006.01)
*B24D 18/00* (2006.01)

(52) U.S. Cl.
CPC ........ *B24D 11/001* (2013.01); *B24D 18/0072* (2013.01)

(58) Field of Classification Search
CPC .......... B24D 11/001; B24D 3/00; B24D 3/02; B24D 11/00; B24D 18/0072; B24D 18/00
See application file for complete search history.

(56) References Cited

U.S. PATENT DOCUMENTS 2,958,593 A  11/1960 Hoover
4,227,350 A  10/1980 Fitzer
(Continued)

FOREIGN PATENT DOCUMENTS

CN  202964430  6/2013
DE  102 013 212 617  * 12/2014  ............. B24D 11/00
(Continued)

OTHER PUBLICATIONS

International Search report for PCT International Application No. PCT/US2017/053168 dated Jan. 31, 2018, 4 pages.

*Primary Examiner* — Pegah Parvini
(74) *Attorney, Agent, or Firm* — Katherine M. Scholz

(57) ABSTRACT

In some examples, an abrasive particle transfer system including a production tool including a dispensing surface with a plurality of cavities formed therein; abrasive particles removably disposed within at least some of the cavities; and a nonwoven substrate having an outer surface opposing the dispensing surface of the production tool, wherein the dispending surface of the production tool is configured to apply a compressive force to the outer surface of the nonwoven substrate to compress the nonwoven substrate from a first thickness to a second thickness, wherein, while the nonwoven substrate is compressed to the second thickness by the production tool, the abrasive particles are transferred from the plurality of cavities to the nonwoven substrate.

13 Claims, 6 Drawing Sheets

(56) References Cited

U.S. PATENT DOCUMENTS

| | | |
|---|---|---|
| 4,314,827 A | 2/1982 | Leitheiser |
| 4,418,120 A | 11/1983 | Kealy |
| 4,588,419 A | 5/1986 | Caul |
| 4,623,364 A | 11/1986 | Cottringer |
| 4,652,275 A | 3/1987 | Bloecher |
| 4,744,802 A | 5/1988 | Schwabel |
| 4,751,138 A | 6/1988 | Tumey |
| 4,770,671 A | 9/1988 | Monroe |
| 4,799,939 A | 1/1989 | Bloecher |
| 4,881,951 A | 11/1989 | Wood |
| 4,991,362 A | 2/1991 | Heyer |
| 5,152,917 A | 10/1992 | Pieper |
| 5,201,916 A | 4/1993 | Berg |
| 5,213,591 A | 5/1993 | Celikkaya |
| 5,366,523 A | 11/1994 | Rowenhorst |
| 5,435,816 A | 7/1995 | Spurgeon |
| 5,436,063 A | 7/1995 | Follett |
| 5,591,239 A | 1/1997 | Larson |
| 5,672,097 A | 9/1997 | Hoopman |
| 5,681,361 A | 10/1997 | Sanders, Jr. |
| 5,712,210 A | 1/1998 | Windisch |
| 5,858,140 A | 1/1999 | Berger |
| 5,928,070 A | 7/1999 | Lux |
| 5,946,991 A | 9/1999 | Hoopman |
| 5,975,987 A | 11/1999 | Hoopman |
| 5,984,988 A | 11/1999 | Berg |
| 6,017,831 A | 1/2000 | Beardsley |
| 6,077,601 A * | 6/2000 | DeVoe ............... C08G 59/68 428/323 |
| 6,129,540 A | 10/2000 | Hoopman |
| 8,034,137 B2 | 10/2011 | Erickson |
| 8,142,531 B2 | 3/2012 | Adefris |
| 8,142,532 B2 | 3/2012 | Erickson |
| 8,142,891 B2 | 3/2012 | Culler |
| 2004/0018802 A1 * | 1/2004 | Welygan ............... B24D 3/28 451/28 |
| 2009/0165394 A1 | 7/2009 | Culler |
| 2009/0169816 A1 | 7/2009 | Erickson |
| 2012/0227333 A1 | 9/2012 | Adefris |
| 2013/0040537 A1 | 2/2013 | Schwabel |
| 2013/0125477 A1 | 5/2013 | Adefris |
| 2014/0106126 A1 | 4/2014 | Gaeta |
| 2014/0170362 A1 | 6/2014 | Ali |
| 2014/0290147 A1 | 10/2014 | Seth |
| 2016/0311084 A1 * | 10/2016 | Culler ............... B24D 11/001 |

FOREIGN PATENT DOCUMENTS

| | | |
|---|---|---|
| WO | WO 2000-037218 | 6/2000 |
| WO | WO 2012-112305 | 8/2012 |
| WO | WO 2015-100018 | 7/2015 |
| WO | WO 2015-100020 | 7/2015 |
| WO | WO 2015-100220 | 7/2015 |

* cited by examiner

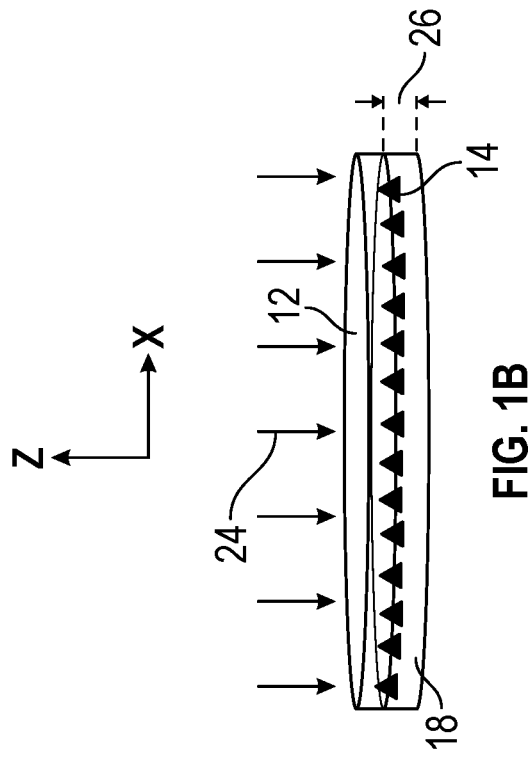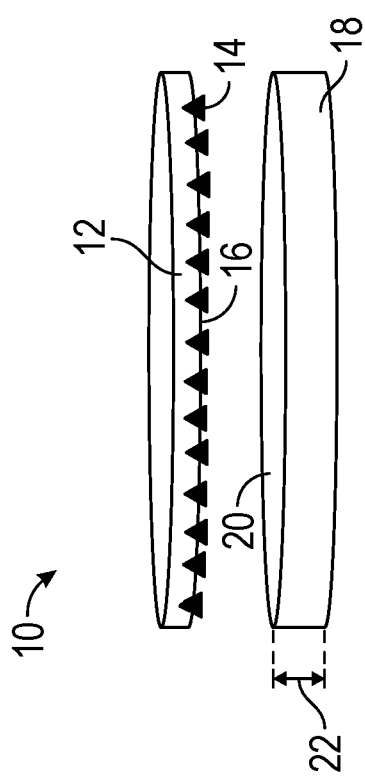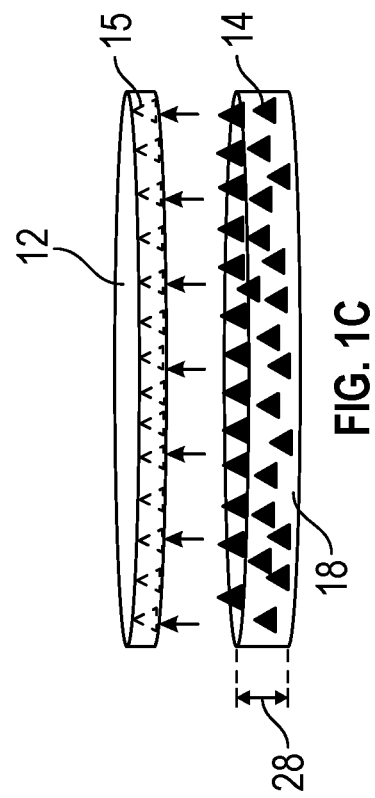
FIG. 1A
FIG. 1B
FIG. 1C

ABRASIVE ARTICLE AND METHOD OF MAKING THE SAME

CROSS REFERENCE TO RELATED APPLICATIONS

This application is a national stage filing under 35 U.S.C. 371 of PCT/US2017/053168, filed Sep. 25, 2017, which claims the benefit of U.S. Provisional Application No. 62/402,546, filed Sep. 30, 2016, the disclosures of which are incorporated by reference in their entireties herein.

TECHNICAL FIELD

The present disclosure relates to abrasive articles including abrasive particles, and methods of making the same.

BACKGROUND

Abrasive articles generally comprise abrasive particles (also known as "grains") adhered to a backing or other substrate, e.g., using a binder. During manufacture of various types of abrasive articles, the abrasive particles may be deposited on a binder precursor in an oriented manner (e.g., by electrostatic coating or by some mechanical placement technique). In the case of nonwoven abrasive articles, the binder precursor may be coated on a lofty open nonwoven fiber web, the abrasive particles are adhered to the binder precursor, and then the binder material precursor is cured sufficiently to retain the abrasive particles during use.

SUMMARY

As described herein, examples of the disclosure relate to systems and techniques for manufacturing abrasive articles including abrasive particles adhered to a nonwoven substrate. In some examples, a system may include a production tool including a dispensing surface with a plurality of cavities. Abrasive particles may be removably disposed within at least some of the cavities in the dispensing surface in a desired orientation and pattern. The nonwoven substrate may include an outer surface positioned opposite the dispensing surface. Prior to transferring the abrasive particles to the nonwoven substrate, the dispensing surface of the production tool may be brought into contact with the opposing surface of the nonwoven substrate such that the substrate is compressed from an initial, uncompressed thickness to a second, compressed thickness. While the nonwoven substrate is compressed, the particles may be transferred from the plurality of cavities of the production tool to the nonwoven substrate. Following the transfer of the particles to the nonwoven substrate, the applied compressive force may then be released to allow the nonwoven substrate to rebound to a third thickness greater than the second thickness. In some examples, the particles transferred to the nonwoven substrate may exhibit the desired orientation and pattern from the cavities in the production tool even after the compressive force has been released.

In one example, the disclosure relates to an abrasive particle transfer system comprising:
 a production tool including a dispensing surface with a plurality of cavities formed therein;
 abrasive particles removably disposed within at least some of the cavities; and
 a nonwoven substrate having an outer surface opposing the dispensing surface of the production tool, wherein the dispending surface of the production tool is configured to apply a compressive force to the outer surface of the nonwoven substrate to compress the nonwoven substrate from a first thickness to a second thickness, wherein, while the nonwoven substrate is compressed to the second thickness by the production tool, the abrasive particles are transferred from the plurality of cavities to the nonwoven substrate.

In another example, the disclosure relates to a method of transferring abrasive particles to a nonwoven substrate, the method comprising:
 providing a production tool including a dispensing surface with a plurality of cavities formed therein, wherein abrasive particles removably disposed within at least some of the cavities;
 compressing a nonwoven substrate having an outer surface opposing the dispensing surface of the production tool via a compressive force applied by the production tool, wherein the nonwoven substrate is compressed from a first thickness to a second thickness; and
 transferring, while the nonwoven substrate is compressed to the second thickness by the production tool, the abrasive particles from the plurality of cavities to the nonwoven substrate.

Features and advantages of the present disclosure will be further understood upon consideration of the detailed description as well as the appended claims.

BRIEF DESCRIPTION OF THE DRAWINGS

FIGS. 1A-1C are conceptual diagrams illustrating an example system for transferring abrasive particles to a nonwoven substrate to form an abrasive article.

Figure 2:
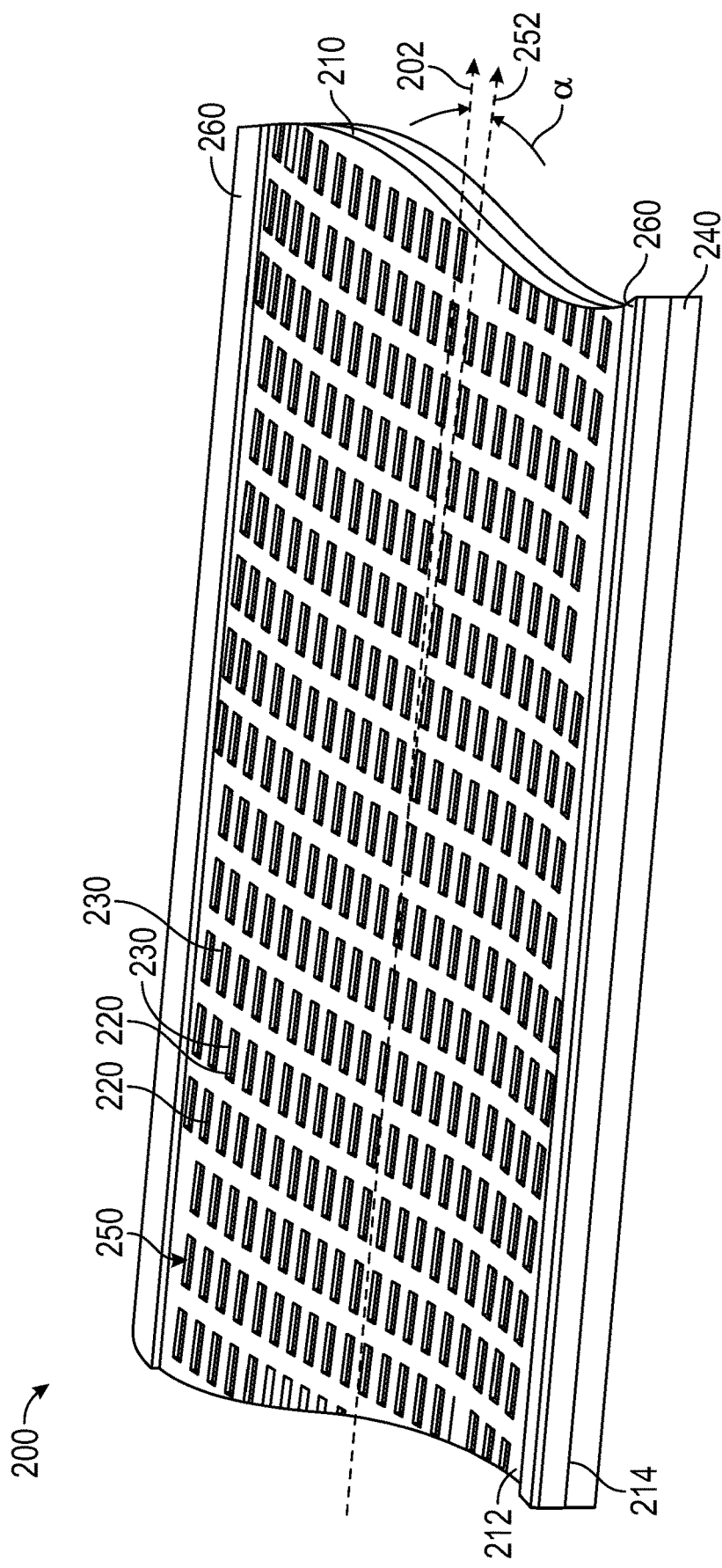
FIG. 2 is a conceptual diagram illustrating an example production tool for transferring abrasive particles to a nonwoven substrate to form an abrasive article.

Repeated use of reference characters in the specification and drawings is intended to represent the same or analogous features or elements of the disclosure. It should be understood that numerous other modifications and embodiments can be devised by those skilled in the art, which fall within the scope and spirit of the principles of the disclosure.

DETAILED DESCRIPTION

As describe above, examples of the present disclosure relate to systems and techniques for forming abrasive articles including abrasive particles on a nonwoven substrate by transferring the particles from a production tool to the nonwoven substrate.

Shaped abrasive particles may be transferred to a flat, adhesive resin coated substrate surface (e.g., a woven cloth) such that the particles maintain a specific pattern and orientation with respect to the optimal cutting configuration. The pattern and orientation may be achieved by employing of a patterned transfer tooling (also referred to as a "production tool") including cavities that are filled with the loose abrasive particles. In some examples, a vacuum source may be utilized to pull the particles into the individual cells in the tooling as well as to provide stability of the filled tooling. The tooling may then be inverted and vacuum released to allow the particles to drop onto an opposing surface of the flat, resin coated substrate. Examples of such a system may include one or more of the examples described in PCT published patent application WO2015/100220. However, in some examples, transferring patterned and oriented particles onto a nonwoven substrate is particularly challenging due, e.g., to the lofty three-dimensional nature of the nonwoven substrate which results in a non-flat surface.

In accordance with one or more examples of the disclosure, to transfer abrasive particles from a production tool to a nonwoven substrate, the nonwoven substrate may first be compressed by application of pressure or other force by an opposing surface of the production tool to create, e.g., an essentially flat or semi-flat surface of the nonwoven substrate. Once the essentially flat or semi-flat surface of the nonwoven substrate is achieved by compressing the nonwoven substrate, abrasive particles may be transferred to the surface of the nonwoven substrate, e.g., using the example systems and techniques described in PCT published patent application WO2015/100220. For example, as described above, a vacuum source holding abrasive particles within the cavities of a production tool positioned opposite the compressed surface of the nonwoven substrate may be released to allow the abrasive particles to deposit onto the compressed nonwoven substrate. Then the pressure applied from the production tool to compress the nonwoven substrate may be released, allowing the nonwoven fibers of the substrate to rebound back to their initial position or some other position different from that of when the pressure was applied to compress the nonwoven substrate.

FIGS. 1A-1C are conceptual diagrams illustrating an example system 10 and process for transferring abrasive particles to a nonwoven substrate to form an abrasive article. As shown in FIGS. 1A-1C, system 10 includes production tool 12, abrasive particles 14 (only a single abrasive particle is labelled in FIGS. 1A-1C for ease of illustration), and nonwoven substrate 18.

In the initial configuration shown in FIG. 1A, abrasive particles 14 are removably disposed within at least some of cavities 15 formed in the dispensing surface 16 of production tool 12 (the cavities are not labelled in FIG. 1A-1B; the empty cavities 15 are labelled in FIG. 1C). For example, as described above, a vacuum source may be employed to temporarily hold abrasive particles 14 in cavities 15 of production tool 12. Cavities 15 may have a complimentary shape to the intended abrasive particle 14 to be contained therein. The configuration of cavities 15 in production tool 12 may provide for a desired orientation and pattern of abrasive particles 14. Outer surface 20 of nonwoven substrate 18 is separated from and opposes dispensing surface 16 of production tool 12, and nonwoven substrate 18 exhibits first thickness 22.

In the subsequent configuration of system 10 shown in FIG. 1B, production tool 12 has been moved relative to nonwoven substrate 18 such that all or a portion of dispensing surface 16 contacts outer surface 20 of nonwoven substrate 18 and applies pressure 24 or other compressive force into outer surface 20 of nonwoven substrate 18. Under the applied pressure 24, nonwoven substrate 18 is compressed to second thickness 26. Once nonwoven substrate 18 is compressed to second thickness 24 as shown in FIG. 1B, abrasive particles 14 may be transferred from cavities 15 in dispensing surface 16 to outer surface 20 of the compressed nonwoven substrate 18, e.g., by releasing a vacuum that was holding abrasive particles 14 within the cavities of production tool 12. As will be described further below, in some examples, nonwoven substrate 18 may include a plurality of individual fibers coated with an adhesive resin that adheres the abrasive particles to the fibers of nonwoven substrate 18.

Referring to FIG. 1C, once abrasive particles 14 have been transferred from cavities 15 of production tool 12 to nonwoven substrate 18, the pressure 24 or other compressive force applied by production tool 12 to nonwoven substrate 18 may be released and dispensing surface 16 may be separated from outer surface 20 of substrate 18. Once the applied pressure 24 or other compressive force is released, nonwoven substrate 18 may rebound back to third thickness 28 that is greater than second thickness 26 when the fibers of nonwoven substrate 18 return to an uncompressed configuration.

Prior to being compressed by production tool 12 as shown in FIG. 1A, first thickness 22 of nonwoven substrate 18 in an uncompressed state may be at least about 3 mm, at least about 6 mm, or at least about 10 mm; and/or less than about 50 mm, or less than about 25 mm, although greater and lesser thicknesses may also be useful.

When compressed by production tool 12 as shown in FIG. 1B, e.g., second thickness 26 of nonwoven substrate 18 is less than that of first thickness 22 of substrate. In some examples, second thickness 26 may be at least about 90%, at least about 80%, at least about 70%, at least about 60%, in some examples preferably at least about 50%, at least about 40%, at least about 30%, at least about 20%, at least about 10%, or at least about 5% of first thickness 22. In some examples, second thickness 26 may be less than about 90%, less than about 80%, less than about 70%, less than about 60%, in some examples preferably less than about 50%, less than about 40%, less than about 30%, less than about 20%, less than about 10%, or less than about 5% of first thickness 22. In some examples, second thickness 26 may be about 50% to about 10% of first thickness 22. In some examples, second thickness 26 of nonwoven substrate 18 may be less than about 50 mm, or less than about 25 mm, although greater and lesser thicknesses may also be useful. In the case of a scrim backed nonwoven substrate, second thickness 26 may be less than about 65%, such as, e.g., approximately 60% of first thickness 22. Other values are contemplated.

After pressure 24 is released by production tool 12 as shown in FIG. 1C, e.g., nonwoven substrate 18 may rebound to third thickness 28. In general, third thickness 28 may be greater than second thickness 26 such that the thickness of nonwoven substrate 18 may increase in thickness to at least some degree compared to second thickness 26 while being compressed by production tool 12. In some examples, third thickness 26 may be approximately equal to or greater than first thickness 22, least about 99%, least about 95%, at least about 90%, at least about 80%, at least about 70%, at least about 70%, in some examples preferably at least about 50%, at least about 40%, at least about 30%, at least about 20%, at least about 10%, or at least about 5% of first thickness 22. Other values are contemplated.

System 10 may be configured to apply an amount of pressure 24 or other compressive force suitable to compress nonwoven substrate (e.g., along substantially the negative z-direction) to a desired thickness. The amount of pressure 24 required to achieve the desired compressed thickness of nonwoven substrate 18 may depend on a number of factors, which may include but is not limited to the composition and orientation of nonwoven substrate 18, the overall percent decrease in the compressed thickness 26 compared to the uncompressed, initial thickness 22, and/or overall compressed thickness 26 of substrate 18. In some examples, the applied pressure 24 may be about 0.1 pounds per square inch (psi) to about 100 psi, such as, e.g., about 5 psi to about 10 psi, or at least about 2 psi, such as, e.g., at least about 1 psi.

In some examples, pressure 34 may be applied as shown in FIG. 1B by moving production tool 12 in the negative z-axis direction while the position of nonwoven substrate 18 is substantially constant along the z-axis direction. In some examples, pressure 34 may be applied as shown in FIG. 1B by moving nonwoven substrate 18 in the positive z-axis direction while the position of production tool 12 is substantially constant along the z-axis direction. In some examples, pressure 34 may be applied as shown in FIG. 1B by moving both nonwoven substrate 18 and production tool 12 along the z-axis direction, e.g., by moving production tool 12 in the negative z-axis direction while the position of production tool 12 is moved in the positive z-axis direction. A relatively rigid support member may be positioned on the top surface of production tool 12 and/or on the bottom surface of nonwoven substrate 18 to support to allow for the desired compression of nonwoven substrate 18.

As will be described further below, nonwoven substrate 18 may include a plurality of individual fibers within the volume of substrate 18. At least some of the fibers extend to some extent along the z-axis direction of substrate 18, e.g., as compared to a substrate in which all the fibers extend along the x-y axis plane to define a substantially flat or planar outer surface. In some examples, when compressed to second thickness 26, the individual fibers within the volume of nonwoven substrate 18 may be temporarily realigned from extending along the z-axis direction to extend more generally along the x-y axis plane. In some examples, by realigning the fibers of nonwoven substrate 18 in such a manner, outer surface 20 of substrate 18 may essentially define a flat or substantially flat surface onto which abrasive particles 14 may be transferred. In some examples, internal fibers within the volume of the nonwoven substrate may be exposed to the outer surface when the nonwoven substrate is compressed such that the internal fibers are brought into contact with the transferred abrasive particles as compared to if the substrate where in an uncompressed state in which case the outer fiber layers would have blocked or otherwise prevent contact with internal fibers.

It has been surprisingly found that by employing, e.g., the process of FIGS. 1A-1C, abrasive particles that have been transferred from a production tool to a compressed nonwoven substrate substantially maintain the desired pattern and orientation on the nonwoven fibers of the substrate even after the fibers of nonwoven substrate spring back to their natural state.

The process illustrated in FIGS. 1A-1C may be carried out to provide for transfer of abrasive particles 14 to nonwoven substrate 18 when compressed to second thickness 26 using a continuous or batch processing. For example, in the case of batch processing of abrasive articles using the process of FIGS. 1A-1C, a hydraulic press with two opposing platens may be employed. Production tool 18 including abrasive particles 14 disposed within cavities 15 may be placed on nonwoven substrate between the platen with dispensing surface 16 opposing outer surface 20. Pressure 34 may then be applied by the press to compress nonwoven substrate 18 to second thickness 26 as shown in FIG. 1B. As described above, once nonwoven substrate 18 is compress, particles 14 may be transferred from cavities 15 in dispensing surface 16 to nonwoven substrate 18. Pressure 34 applied by the press may then be released to allow nonwoven substrate 18 to rebound to third thickness 28. Other systems for performing such batch processing are contemplated.

In the case of continuous process for transferring abrasive particles 14 to nonwoven substrate 18 in accordance with the process of FIGS. 1A-1C, any suitable system may be employed. Suitable example systems may include one or more of the example systems described in PCT published patent application WO2015/100220 (which is incorporated herein in its entirety) modified to compress a nonwoven substrate and transfer abrasive particles to the compressed substrate.

Figure 3A:
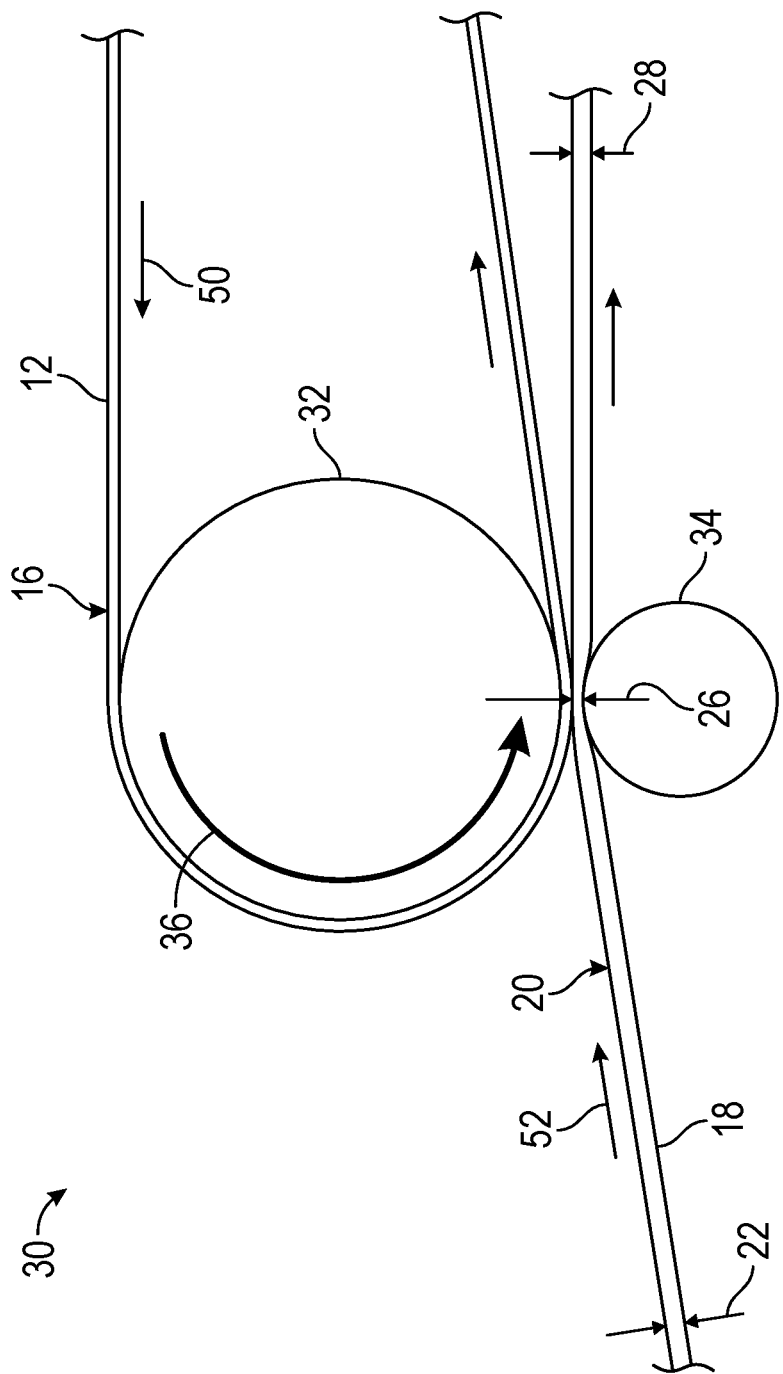
FIGS. 3A and 3B are conceptual diagram illustrating another example system for transferring abrasive particles to a nonwoven substrate to form an abrasive article.
Figure 3B:
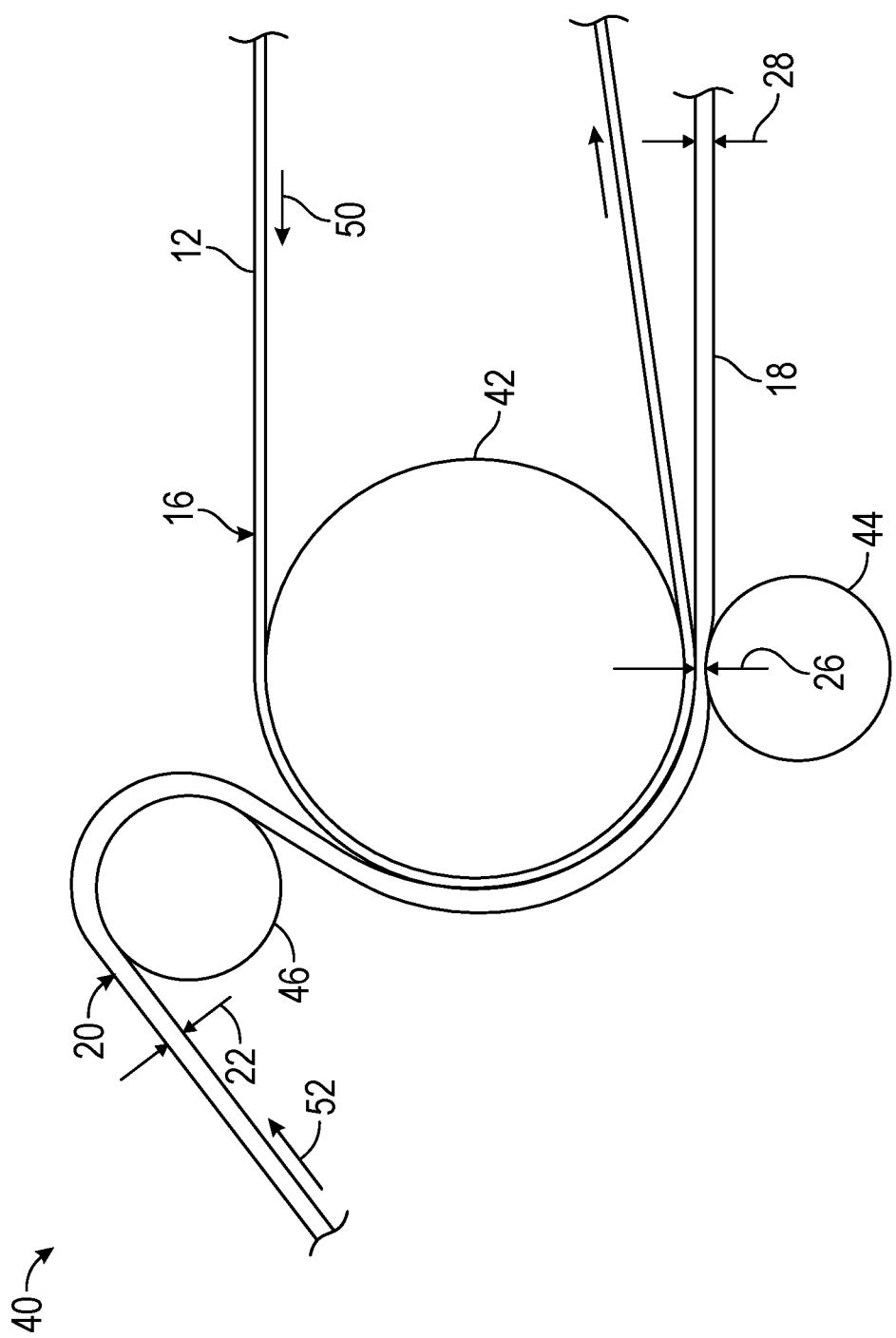

FIGS. 3A and 3B are schematic diagrams illustrating example portions of a continuous manufacturing systems for transferring abrasive particles 14 (not shown) from production tool 12 to nonwoven substrate 18 while substrate 18 is compressed. Referring to FIG. 3A, abrasive particles 14 may be removably disposed in cavities 15 of production tool 12 and production tool 12 may be guided along a first web path such that the back surface of tool 12 opposite dispensing surface 16 contacts first transfer roller 32 along a portion of the outer circumference of roll 32. Production tool 12 partially wraps around roller 32 such that it is guided between roller 32 and opposing roller 34. Nonwoven substrate 18 is also guided along second web path 52 between roller 32 and roller 34 such that the outer surface 20 contacts dispensing surface of production tool 12 between the rollers. The gap between roller 32 and roller 34 is provided such that nonwoven substrate 18 is compressed by production tool 12 to second thickness 28. Abrasive particles 14 are transferred from cavities 15 of production tool 12 to nonwoven substrate 18 when compressed, e.g., by releasing vacuum 36 which was initially applied over a portion of roller 32 to secure abrasive particles 14 within cavities 15 of production tool. Once abrasive particles 14 are transferred, nonwoven substrate 18 rebounds to third thickness 28 along second web path 52 after no longer being compressed between roller 32 and roller 34. Production tool 12 continues along first web path 50 with cavities 15 no longer filled with abrasive particles 14.

Referring to FIG. 3B, the configuration is similar to that of FIG. 3A. Abrasive particles 14 may be removably disposed in cavities 15 of production tool 12 and production tool 12 may be guided along a first web path such that the back surface of tool 12 opposite dispensing surface 16 contacts first transfer roller 42 along a portion of the outer circumference of roll 42. Production tool 12 partially wraps around roller 42 such that it is guided between roller 42 and opposing roller 44. Nonwoven substrate 18 is also guided along second web path 52 over roller 46 into contact with dispensing surface 16 of production tool 12 over the outer circumference of roller 42, and then guided between roller 42 and roller 42 such that the outer surface 20 contacts dispensing surface of production tool 12 between the rollers. The gap between roller 42 and roller 44 is provided such that nonwoven substrate 18 is compressed by production tool 12 to second thickness 28. Abrasive particles 14 are transferred from cavities 15 of production tool 12 to nonwoven substrate 18 when compressed. For example, the particles 14 may be transferred by gravity and/or direct contact of the resin coated nonwoven substrate. In some examples, an ultrasonic device in contact with web path 50 in FIG. 3B may be employed upon exit from the transfer roll 42 for vibration assistance of the transfer. In some examples, roller 44 is preferred to be at the end of the web wrap on roller 42 but does not need to be. Roller 44 may be anywhere along the web wrap of roller 42 and the two webs do not need to be immediately separated.

Once abrasive particles 14 are transferred, nonwoven substrate 18 rebounds to third thickness 28 along second web path 52 after no longer being compressed between roller 42 and roller 44. Production tool 12 continues along first web path 50 with cavities 15 no longer filled with abrasive particles 14.

The embodiments of FIGS. 3A and 3B are exemplarily. Other embodiments are contemplated.

As described herein, examples of the disclosure may employ a production tool, such as, e.g., production tool 12, including abrasive particles removably disposed within shaped cavities of the production tool to transfer the abrasive particles to a compressed nonwoven substrate. FIG. 2 illustrates one example of production tool 200 that may be suitable for use in embodiments of the disclosure. However, other example production tools for transferring particles to a compressed nonwoven substrate are contemplated.

Referring now to FIG. 2, exemplary production tool 200 comprises carrier member 210 having dispensing and back surfaces 212, 214. Dispensing surface 212 comprises cavities 220 that extend into carrier member 210 from cavity openings 230 at the dispensing surface 212. Optional compressible resilient layer 240 is secured to back surface 214. Cavities 220 are disposed in an array 250, which is disposed with a primary axis 252 at offset angle α relative to longitudinal axis 202 (corresponding to the machine direction in the case of a belt or roll) of production tool 200.

Typically, the openings of the cavities at the dispensing surface of the carrier member are rectangular; however, this is not a requirement. The length, width, and depth of the cavities in the carrier member will generally be determined at least in part by the shape and size of the abrasive particles with which they are to be used. For example, if the abrasive particles are shaped as equilateral trigonal plates, then the lengths of individual cavities should preferably be from 1.1-1.2 times the maximum length of a side of the abrasive particles, the widths of individual cavities are preferably from 1.1-2.5 times the thickness of the abrasive particles, and the respective depths of the cavities should are preferably 1.0 to 1.2 times the width of the abrasive particles if the abrasive particles are to be contained within the cavities.

Alternatively, for example, if the abrasive particles are shaped as equilateral trigonal plates, then the lengths of individual cavities should be less than that of an edge of the abrasive particles, and/or the respective depths of the cavities should be less than that of the width of the abrasive particles if the abrasive particles are to protrude from the cavities. Similarly, the width of the cavities should be selected such that a single abrasive particle fits within each one of the cavities.

Similarly, the width of the cavities should be selected such that a single abrasive particle fits within each one of the cavities.

Optional longitudinally-oriented standoff members 260 are disposed along opposite edges (e.g., using adhesive or other means) of dispensing surface 212. Variations in design of the standoff member's height allow adjustment of distance between the cavity openings 230 and a substrate (e.g., a backing having a make coat precursor thereon) that is brought into contact with the production tool.

If present, the longitudinally-oriented standoff members 260 may have any height, width and/or spacing (preferably they have a height of from about 0.1 mm to about 1 mm, a width of from about 1 mm to about 50 mm, and a spacing of from about 7 to about 24 mm). Individual longitudinally-oriented standoff members may be, for example, continuous (e.g., a rib) or discontinuous (e.g., a segmented rib, or a series of posts). In the case, that the production tool comprises a web or belt, the longitudinally-oriented standoff members are typically parallel to the machine direction.

The function of offset angle α is to arrange the abrasive particles on the ultimate coated abrasive article in a pattern that will not cause grooves in a workpiece. The offset angle α may have any value from 0 to about 30 degrees, but preferably is in a range of from 1 to 5 degrees, more preferably from 1 to 3 degrees.

Suitable carrier members may be rigid or flexible, but preferably are sufficiently flexible to permit use of normal web handling devices such as rollers. Preferably, the carrier member comprises metal and/or organic polymer. Such organic polymers are preferably moldable, have low cost, and are reasonably durable when used in the abrasive particle deposition process of the present disclosure. Examples of organic polymers, which may be thermosetting and/or thermoplastic, that may be suitable for fabricating the carrier member include: polypropylene, polyethylene, vulcanized rubber, polycarbonates, polyamides, acrylonitrile-butadiene-styrene plastic (ABS), polyethylene terephthalate (PET), polybutylene terephthalate (PET), polyimides, polyetheretherketone (PEEK), polyetherketone (PEK), and polyoxymethylene plastic (POM, acetal), poly(ether sulfone), poly(methyl methacrylate), polyurethanes, polyvinyl chloride, and combinations thereof.

The production tool can be in the form of, for example, an endless belt (e.g., endless belt 200 shown in FIG. 1A), a sheet, a continuous sheet or web, a coating roll, a sleeve mounted on a coating roll, or die. If the production tool is in the form of a belt, sheet, web, or sleeve, it will have a contacting surface and a non-contacting surface. If the production tool is in the form of a roll, it will have a contacting surface only. The topography of the abrasive article formed by the method will have the inverse of the pattern of the contacting surface of the production tool. The pattern of the contacting surface of the production tool will generally be characterized by a plurality of cavities or recesses. The opening of these cavities can have any shape, regular or irregular, such as, for example, a rectangle, semi-circle, circle, triangle, square, hexagon, or octagon. The walls of the cavities can be vertical or tapered. The pattern formed by the cavities can be arranged according to a specified plan or can be random. Desirably, the cavities can butt up against one another.

The carrier member can be made, for example, according to the following procedure. A master tool is first provided. The master tool is typically made from metal, e.g., nickel. The master tool can be fabricated by any conventional technique, such as, for example, engraving, hobbing, knurling, electroforming, diamond turning, or laser machining. If a pattern is desired on the surface of the production tool, the master tool should have the inverse of the pattern for the production tool on the surface thereof. The thermoplastic material can be embossed with the master tool to form the pattern. Embossing can be conducted while the thermoplastic material is in a flowable state. After being embossed, the thermoplastic material can be cooled to bring about solidification.

The carrier member may also be formed by embossing a pattern into an already formed polymer film softened by heating. In this case, the film thickness may be less than the cavity depth. This is advantageous in improving the flexibility of carriers having deep cavities.

The carrier member can also be made of a cured thermosetting resin. A production tool made of thermosetting material can be made according to the following procedure. An uncured thermosetting resin is applied to a master tool of the type described previously. While the uncured resin is on the surface of the master tool, it can be cured or polymerized by heating such that it will set to have the inverse shape of the pattern of the surface of the master tool. Then, the cured thermosetting resin is removed from the surface of the master tool. The production tool can be made of a cured radiation curable resin, such as, for example acrylated urethane oligomers. Radiation cured production tools are made in the same manner as production tools made of thermosetting resin, with the exception that curing is conducted by means of exposure to radiation (e.g., ultraviolet radiation).

The carrier member may have any thickness as long as it has sufficient depth to accommodate the abrasive particles and sufficient flexibility and durability for use in manufacturing processes. If the carrier member comprises an endless belt, then carrier member thicknesses of from about 0.5 to about 10 millimeters are typically useful; however, this is not a requirement.

The cavities may have any shape, and are typically selected depending on the specific application. Preferably, at least a portion (and more preferably a majority, or even all) of the cavities are shaped (i.e., individually intentionally engineered to have a specific shape and size), and more preferably are precisely-shaped. In some embodiments, the cavities have smooth walls and sharp angles formed by a molding process and having an inverse surface topography to that of a master tool (e.g., a diamond turned metal master tool roll) in contact with which it was formed. The cavities may be closed (i.e., having a closed bottom).

Preferably, at least some of the sidewalls taper inwardly from their respective cavity opening at the dispensing surface of the carrier member with increasing cavity depth, or the cavity opening at the back surface. More preferably, all of the sidewalls taper inwardly from the opening at the dispensing surface of the carrier member with increasing cavity depth (i.e., with increasing distance from the dispensing surface).

In some embodiments, at least some of the cavities comprise first, second, third, and fourth sidewalls. In such embodiments, the first, second, third, and fourth side walls may be consecutive and contiguous.

In embodiments in which the cavities have no bottom surface but do not extend through the carrier member to the back surface, the first and third walls may intersect at a line, while the second and fourth sidewalls do not contact each other.

Various methods can be employed to transfer the abrasive particles from cavities of the production tool to the compressed nonwoven substrate. In no particular order the various examples methods may include, but are not limited to:
1. Gravity assist where the production tool and dispensing surface is inverted for a portion of its machine direction travel and the abrasive particles fall out of the cavities under the force of gravity onto the compressed nonwoven substrate.
2. Pushing assist where each cavity in the production tool has two open ends such that the abrasive particle can reside in the cavity with a portion of the abrasive particle extending past the back surface 214 of the production tool. With push assist the production tool no longer needs to be inverted but it still may be inverted. As the production tool wraps the abrasive particle transfer roll, the roll's outer surface engages with the abrasive particle in each cavity and pushes the abrasive particle out of the cavity and into the resin layer on the resin coated backing. In some embodiments, the outer surface of the abrasive particle transfer roll comprises a resilient compressible layer with hardness Shore A durometer of, for example, 20-70, applied to provide additional compliance as the abrasive particle pushes into the resin coated backing. In another embodiment of pushing assist, the back surface of the production tool can be covered with a resilient compressible layer instead of or in addition to the resilient outer layer of the abrasive particle transfer roll.
3. Vibration assist where, e.g., the abrasive particle transfer roll or production tool is vibrated by a suitable source such as an ultrasonic device to shake the abrasive particles out of the cavities and onto the compressed nonwoven substrate.
4. Pressure assist where each cavity in the production tool has two open ends or the back surface or the entire production tool is suitably porous and the abrasive particle transfer roll has a plurality of apertures and an internal pressurized source of air. With pressure assist the production tool no longer needs to be inverted but it still may be inverted. The abrasive particle transfer roll can also have movable internal dividers such that the pressurized air can be supplied to a specific arc segment or circumference of the roll to blow the abrasive particles out of the cavities and onto the resin coated backing at a specific location. In some embodiments, the abrasive particle transfer roll may also be provided with an internal source of vacuum without a corresponding pressurized region or in combination with the pressurized region typically prior to the pressurized region as the abrasive particle transfer roll rotates. The vacuum source or region can have movable dividers to direct it to a specific region or arc segment of the abrasive particle transfer roll. The vacuum can suck the abrasive particles firmly into the cavities as the production tool wraps the abrasive particle transfer roll before subjecting the abrasive particles to the pressurized region of the abrasive particle transfer roll. This vacuum region be used, for example, with an abrasive particle removal member to remove excess abrasive particles from the dispensing surface or may be used to simply ensure the abrasive particles do not leave the cavities before reaching a specific position along the outer circumference of the abrasive particles transfer roll.
5. The various above listed embodiments are not limited to individual usage and they can be mixed and matched as necessary to more efficiently transfer the abrasive particles from the cavities to the resin coated backing.

During the transfer process, the pattern of abrasive particles and their specific orientation as arranged in the production tool positions each abrasive particle may be substantially reproduced onto the nonwoven substrate.

Example systems and techniques described herein may be employed to form nonwoven abrasive articles. In some examples, the nonwoven abrasive articles may include an open porous lofty fiber web having abrasive particles distributed throughout the structure and adherently bonded therein by a resin binder material. An exemplary embodiment of a nonwoven abrasive article includes a lofty open low-density fibrous web that is formed of entangled fibers. The abrasive particles may be secured to the fibrous web on the exposed surfaces of the fibers by binder material, which also binds the fibers together at points where they contact one another.

Nonwoven fiber substrates suitable for use are known in the abrasives art. Typically, the nonwoven fiber substrate comprises an entangled web of fibers. Examples of filaments include polyester fibers, polyamide fibers, and polyaramid fibers. The fibers may comprise continuous fiber, staple fiber, or a combination thereof. For example, the fiber web may comprise staple fibers having a length of at least about 20 millimeters (mm), at least about 30 mm, or at least about 40 mm, and less than about 110 mm, less than about 85 mm, or less than about 65 mm, although shorter and longer fibers (e.g., continuous filaments) may also be useful. The fibers may have a fineness or linear density of at least about 1.7 decitex (dtex, i.e., grams/10000 meters), at least about 6 dtex, or at least about 17 dtex, and less than about 560 dtex, less than about 280 dtex, or less than about 120 dtex, although fibers having lesser and/or greater linear densities may also be useful. Mixtures of fibers with differing linear densities may be useful, for example, to provide an abrasive article that upon use will result in a specifically preferred surface finish. If a spunbond nonwoven is used, the filaments may be of substantially larger diameter, for example, up to 2 mm or more in diameter.

The fiber web may be made, for example, by conventional air laid, carded, stitch bonded, spun bonded, wet laid, and/or melt blown procedures. Air laid fiber webs may be prepared using equipment such as, for example, that available under the trade designation RANDO WEBBER from Rando Machine Company of Macedon, N.Y.

Nonwoven fiber webs are typically selected to be compatible with adhering binders and abrasive particles while also being compatible with other components of the article, and typically can withstand processing conditions (e.g., temperatures) such as those employed during application and curing of the curable binder precursor. The fibers may be chosen to affect properties of the abrasive article such as, for example, flexibility, elasticity, durability or longevity, abrasiveness, and finishing properties. Examples of fibers that may be suitable include natural fibers, synthetic fibers, and mixtures of natural and/or synthetic fibers. Examples of synthetic fibers include those made from polyester (e.g., polyethylene terephthalate), nylon (e.g., hexamethylene adipamide, polycaprolactam), polypropylene, acrylonitrile (i.e., acrylic), rayon, cellulose acetate, polyvinylidene chloride-vinyl chloride copolymers, and vinyl chloride-acrylonitrile copolymers. Examples of suitable natural fibers include cotton, wool, jute, and hemp. The fiber may be of virgin material or of recycled or waste material, for example, reclaimed from garment cuttings, carpet manufacturing, fiber manufacturing, or textile processing. The fiber may be homogenous or a composite such as a bicomponent fiber (e.g., a co-spun sheath-core fiber). The fibers may be tensilized and crimped, but may also be continuous filaments such as those formed by an extrusion process. Combinations of fibers may also be used.

Prior to coating and/or impregnation with a binder precursor composition, the nonwoven fiber web typically has a weight per unit area (i.e., basis weight) of at least about 50 grams per square meter (gsm), at least about 100 gsm, or at least about 150 gsm; and/or less than about 600 gsm, less than about 500 gsm, or less than about 400 gsm, as measured prior to any coating (e.g., with the curable binder precursor or optional pre-bond resin), although greater and lesser basis weights may also be used.

Frequently, as known in the abrasives art, it is useful to apply a prebond resin to the nonwoven fiber web prior to coating with the curable binder precursor. The prebond resin serves, for example, to help maintain the nonwoven fiber web integrity during handling, and may also facilitate bonding of the urethane binder to the nonwoven fiber web. Examples of prebond resins include phenolic resins, urethane resins, hide glue, acrylic resins, urea-formaldehyde resins, melamine-formaldehyde resins, epoxy resins, and combinations thereof. The amount of pre-bond resin used in this manner is typically adjusted toward the minimum amount consistent with bonding the fibers together at their points of crossing contact. In those cases, wherein the nonwoven fiber web includes thermally bondable fibers, thermal bonding of the nonwoven fiber web may also be helpful to maintain web integrity during processing.

In those nonwoven abrasive articles including a lofty open nonwoven fiber web (e.g., hand pads, and surface conditioning discs and belts, flap brushes, or nonwoven abrasive webs used to make unitized or convolute abrasive wheels) many interstices between adjacent fibers that are substantially unfilled by the binder and abrasive particles, resulting in a composite structure of extremely low density having a network on many relatively large intercommunicated voids. The resulting lightweight, lofty, extremely open fibrous construction is essentially non-clogging and non-filling in nature, particularly when used in conjunction with liquids such as water and oils. These structures also can be readily cleaned upon simple flushing with a cleansing liquid, dried, and left for substantial periods of time, and then reused. Towards these ends, the voids in these nonwoven abrasive articles may make up at least about 75 percent, and preferably more, of the total space occupied by the composite structure.

One method of making nonwoven abrasive articles according to the present invention includes the steps in the following order: applying a prebond coating to the nonwoven fiber web (e.g., by roll-coating or spray coating), curing the prebond coating, impregnating the nonwoven fiber web with a make layer precursor that is a curable tacky binder material precursor according to the present disclosure (e.g., by roll-coating or spray coating), applying abrasive particles to the make layer precursor, at least partially curing make layer precursor, and then optionally applying a size layer precursor (e.g., as described herein above), and curing it and the make layer precursor (e.g., as described hereinabove), if necessary.

Further details regarding nonwoven abrasive articles and methods for their manufacture can be found, for example, in U.S. Pat. No. 2,958,593 (Hoover et al.); U.S. Pat. No. 4,227,350 (Fitzer); U.S. Pat. No. 4,991,362 (Heyer et al.); U.S. Pat. No. 5,712,210 (Windisch et al.); U.S. Pat. No. 5,591,239 (Edblom et al.); U.S. Pat. No. 5,681,361 (Sanders); U.S. Pat. No. 5,858,140 (Berger et al.); U.S. Pat. No. 5,928,070 (Lux); and U.S. Pat. No. 6,017,831 (Beardsley et al.).

Abrasive particles 14 may have sufficient hardness and surface roughness to function as abrasive particles in abrading processes. Preferably, the abrasive particles have a Mohs hardness of at least 4, at least 5, at least 6, at least 7, or even at least 8. Exemplary abrasive particles include crushed, shaped abrasive particles (e.g., shaped ceramic abrasive particles or shaped abrasive composite particles), and combinations thereof.

Examples of suitable abrasive particles include: fused aluminum oxide; heat-treated aluminum oxide; white fused aluminum oxide; ceramic aluminum oxide materials such as those commercially available under the trade designation 3M CERAMIC ABRASIVE GRAIN from 3M Company, St. Paul, Minn.; brown aluminum oxide; blue aluminum oxide; silicon carbide (including green silicon carbide); titanium diboride; boron carbide; tungsten carbide; garnet; titanium carbide; diamond; cubic boron nitride; garnet; fused alumina zirconia; iron oxide; chromia; zirconia; titania; tin oxide; quartz; feldspar; flint; emery; sol-gel-derived abrasive particles (e.g., including shaped and crushed forms); and combinations thereof. Further examples include shaped abrasive composites of abrasive particles in a binder matrix, such as those described in U.S. Pat. No. 5,152,917 (Pieper et al.). Many such abrasive particles, agglomerates, and composites are known in the art.

Examples of sol-gel-derived abrasive particles and methods for their preparation can be found in U.S. Pat. No. 4,314,827 (Leitheiser et al.); U.S. Pat. No. 4,623,364 (Cottringer et al.); U.S. Pat. No. 4,744,802 (Schwabel), U.S. Pat. No. 4,770,671 (Monroe et al.); and U.S. Pat. No. 4,881,951 (Monroe et al.). It is also contemplated that the abrasive particles could comprise abrasive agglomerates such, for example, as those described in U.S. Pat. No. 4,652,275 (Bloecher et al.) or U.S. Pat. No. 4,799,939 (Bloecher et al.). In some embodiments, the abrasive particles may be surface-treated with a coupling agent (e.g., an organosilane coupling agent) or other physical treatment (e.g., iron oxide or titanium oxide) to enhance adhesion of the abrasive particles to the binder. The abrasive particles may be treated before combining them with the binder, or they may be surface treated in situ by including a coupling agent to the binder.

Preferably, the abrasive particles comprise ceramic abrasive particles such as, for example, sol-gel-derived polycrystalline alpha alumina particles. The abrasive particles may be may be crushed or shaped, or a combination thereof.

Shaped ceramic abrasive particles composed of crystallites of alpha alumina, magnesium alumina spinel, and a rare earth hexagonal aluminate may be prepared using sol-gel precursor alpha alumina particles according to methods described in, for example, U.S. Pat. No. 5,213,591 (Celikkaya et al.) and U.S. Publ. Pat. Appln. Nos. 2009/0165394 A1 (Culler et al.) and 2009/0169816 A1 (Erickson et al.).

Alpha alumina-based shaped ceramic abrasive particles can be made according to well-known multistep processes. Briefly, the method comprises the steps of making either a seeded or non-seeded sol-gel alpha alumina precursor dispersion that can be converted into alpha alumina; filling one or more mold cavities having the desired outer shape of the shaped abrasive particle with the sol-gel, drying the sol-gel to form precursor shaped ceramic abrasive particles; removing the precursor shaped ceramic abrasive particles from the mold cavities; calcining the precursor shaped ceramic abrasive particles to form calcined, precursor shaped ceramic abrasive particles, and then sintering the calcined, precursor shaped ceramic abrasive particles to form shaped ceramic abrasive particles.

Further details concerning methods of making sol-gel-derived abrasive particles can be found in, for example, U.S. Pat. No. 4,314,827 (Leitheiser); U.S. Pat. No. 5,152,917 (Pieper et al.); U.S. Pat. No. 5,435,816 (Spurgeon et al.); U.S. Pat. No. 5,672,097 (Hoopman et al.); U.S. Pat. No. 5,946,991 (Hoopman et al.); U.S. Pat. No. 5,975,987 (Hoopman et al.); and U.S. Pat. No. 6,129,540 (Hoopman et al.); and in U.S. Publ. Pat. Appln. No. 2009/0165394 A1 (Culler et al.).

Although there is no particularly limitation on the shape of the shaped ceramic abrasive particles, the abrasive particles are preferably formed into a predetermined shape by shaping precursor particles comprising a ceramic precursor material (e.g., a boehmite sol-gel) using a mold, followed by sintering. The shaped ceramic abrasive particles may be shaped as, for example, pillars, pyramids, truncated pyramids (e.g., truncated triangular pyramids), and/or some other regular or irregular polygons. The abrasive particles may include a single kind of abrasive particles or an abrasive aggregate formed by two or more kinds of abrasive or an abrasive mixture of two or more kind of abrasives. In some embodiments, the shaped ceramic abrasive particles are precisely-shaped in that individual shaped ceramic abrasive particles will have a shape that is essentially the shape of the portion of the cavity of a mold or production tool in which the particle precursor was dried, prior to optional calcining and sintering.

Shaped ceramic abrasive particles used in the present disclosure can typically be made using tools (i.e., molds) cut using precision machining, which provides higher feature definition than other fabrication alternatives such as, for example, stamping or punching. Typically, the cavities in the tool surface have planar faces that meet along sharp edges, and form the sides and top of a truncated pyramid. The resultant shaped ceramic abrasive particles have a respective nominal average shape that corresponds to the shape of cavities (e.g., truncated pyramid) in the tool surface; however, variations (e.g., random variations) from the nominal average shape may occur during manufacture, and shaped ceramic abrasive particles exhibiting such variations are included within the definition of shaped ceramic abrasive particles as used herein.

In some embodiments, the base and the top of the shaped ceramic abrasive particles are substantially parallel, resulting in prismatic or truncated pyramidal shapes, although this is not a requirement. In some embodiments, the sides of a truncated trigonal pyramid have equal dimensions and form dihedral angles with the base of about 82 degrees. However, it will be recognized that other dihedral angles (including 90 degrees) may also be used. For example, the dihedral angle between the base and each of the sides may independently range from 45 to 90 degrees, typically 70 to 90 degrees, more typically 75 to 85 degrees.

As used herein in referring to shaped ceramic abrasive particles, the term "length" refers to the maximum dimension of a shaped abrasive particle. "Width" refers to the maximum dimension of the shaped abrasive particle that is perpendicular to the length. The terms "thickness" or "height" refer to the dimension of the shaped abrasive particle that is perpendicular to the length and width.

Preferably, the ceramic abrasive particles comprise shaped ceramic abrasive particles. Examples of sol-gel-derived shaped alpha alumina (i.e., ceramic) abrasive particles can be found in U.S. Pat. No. 5,201,916 (Berg); U.S. Pat. No. 5,366,523 (Rowenhorst (Re 35,570)); and U.S. Pat. No. 5,984,988 (Berg). U.S. Pat. No. 8,034,137 (Erickson et al.) describes alumina abrasive particles that have been formed in a specific shape, then crushed to form shards that retain a portion of their original shape features. In some embodiments, sol-gel-derived shaped alpha alumina particles are precisely-shaped (i.e., the particles have shapes that are at least partially determined by the shapes of cavities in a production tool used to make them. Details concerning such abrasive particles and methods for their preparation can be found, for example, in U.S. Pat. No. 8,142,531 (Adefris et al.); U.S. Pat. No. 8,142,891 (Culler et al.); and U.S. Pat. No. 8,142,532 (Erickson et al.); and in U.S. Pat. Appl. Publ. Nos. 2012/0227333 (Adefris et al.); 2013/0040537 (Schwabel et al.); and 2013/0125477 (Adefris).

In some preferred embodiments, the abrasive particles comprise shaped ceramic abrasive particles (e.g., shaped sol-gel-derived polycrystalline alpha alumina particles) that are generally triangularly-shaped (e.g., a triangular prism or a truncated three-sided pyramid).

Shaped ceramic abrasive particles are typically selected to have a length in a range of from 1 micron to 15000 microns, more typically 10 microns to about 10000 microns, and still more typically from 150 to 2600 microns, although other lengths may also be used. In some embodiments, the length may be expressed as a fraction of the thickness of the bonded abrasive wheel in which it is contained. For example, the shaped abrasive particle may have a length greater than half the thickness of the bonded abrasive wheel. In some embodiments, the length may be greater than the thickness of the bonded abrasive cut-off wheel.

Shaped ceramic abrasive particles are typically selected to have a width in a range of from 0.1 micron to 3500 microns, more typically 100 microns to 3000 microns, and more typically 100 microns to 2600 microns, although other lengths may also be used.

Shaped ceramic abrasive particles are typically selected to have a thickness in a range of from 0.1 micron to 1600 microns, more typically from 1 micron to 1200 microns, although other thicknesses may be used.

In some embodiments, shaped ceramic abrasive particles may have an aspect ratio (length to thickness) of at least 2, 3, 4, 5, 6, or more.

If a particle-adherent layer (e.g., a coating) is used to provide particle-adherent surface, the layer may be of any suitable composition. For example, such a coating may be a "make coat" as is commonly referred to in the abrasive arts. Such a make coat may be e.g. a phenolic resin or any of the other make coat compositions that are known. A make coat applicator 405 can be, for example, a coater, a roll coater, a spray system, or a rod coater.

In some examples, the make coat or other resin adhesive may be a phenolic pressure sensitive adhesive that provides a tacky surface that adheres the particles to the nonwoven substrate from the cavities of the production tool with allowing resin (e.g., substantially no resin) to remain on the surfaces of the production tool (e.g., the dispensing surface).

In various embodiments, the make coat layer is formed by at least partially curing a make layer precursor that is a curable tacky adhesive composition. The tacky curable adhesive composition includes resole phenolic resin and an aliphatic tack modifier, and the amount of resole phenolic resin includes from 60 to 98 weight percent of the combined weight of the resole phenolic resin and the aliphatic tack modifier.

Phenolic resins are generally formed by condensation of phenol and formaldehyde, and are usually categorized as resole or novolac phenolic resins. Novolac phenolic resins are acid catalyzed and have a molar ratio of formaldehyde to phenol of less than 1:1. Resole (also resol) phenolic resins can be catalyzed by alkaline catalysts, and the molar ratio of formaldehyde to phenol is greater than or equal to one, typically between 1.0 and 3.0, thus presenting pendant methylol groups. Alkaline catalysts suitable for catalyzing the reaction between aldehyde and phenolic components of resole phenolic resins include sodium hydroxide, barium hydroxide, potassium hydroxide, calcium hydroxide, organic amines, and sodium carbonate, all as solutions of the catalyst dissolved in water.

Resole phenolic resins are typically coated as a solution with water and/or organic solvent (e.g., alcohol). Typically, the solution includes about 70 percent to about 85 percent solids by weight, although other concentrations may be used.

Phenolic resins are well-known and readily available from commercial sources. Examples of commercially available resole phenolic resins useful in practice of the present disclosure include those marketed by Durez Corporation under the trade designation VARCUM (e.g., 29217, 29306, 29318, 29338, 29353); those marketed by Ashland Chemical Co. of Bartow, Fla. under the trade designation AEROFENE (e.g., AEROFENE 295); and those marketed by Kangnam Chemical Company Ltd. of Seoul, South Korea under the trade designation PHENOLITE (e.g., PHENOLITE TD-2207).

In addition to the resole phenolic resin, the curable tacky binder precursor contains an aliphatic tack modifier. The curable tacky binder precursor contains from 60 to 98 weight percent, or 90 to 98 weight, percent of the resole phenolic resin based on the combined weight of the resole phenolic resin and the aliphatic tack modifier. Accordingly, the curable tacky binder precursor composition contains from 2 to 40 weight percent, or 2 to 10 weight percent, of the aliphatic tack modifier, based on the combined weight of the resole phenolic resin and the aliphatic tack modifier. The aliphatic tack modifier has the unexpected effect of modifying the tackiness of the resole phenolic resin, thereby resulting in the curable tacky binder precursor composition.

Examples of suitable aliphatic tack modifiers include: aliphatic rosins and aliphatic derivatives thereof; aliphatic liquid hydrocarbon resins; aliphatic solid hydrocarbon resins; liquid natural rubber; hydrogenated polybutadiene; polytetramethylene ether glycol; isooctyl acrylate acrylic acid copolymers as described in U.S. Pat. No. 4,418,120 (Kealy et. al; and acrylic zwitterionic amphiphilic polymers as described in U.S. 2014/0170362 A1 (Ali et al.). Combinations of more than one resole phenolic resin and/or more than one aliphatic tack modifier may be used if desired.

Useful aliphatic rosins and aliphatic derivatives thereof include, for example, aliphatic esters of natural and modified rosins and the hydrogenated derivatives thereof (e.g., a glycerol ester of tall oil rosin marketed as PERMALYN 2085 and a glycerol ester of hydrogenated gum rosin marketed as FORAL 5-E, both available from Eastman Chemical Company, and an aliphatic rosin ester dispersion obtained as AQUATAC 6085 from Arizona Chemical, Jacksonville, Fla.), hydrogenated rosin resins (e.g., partially hydrogenated rosin is produced by Eastman Chemical Company as STAYBELITE-E and completely hydrogenated rosin is branded as FORAL AX-E), dimerized rosin resins (e.g., POLY-PALE partially dimerized rosin is a partially dimerized rosin product offered by Eastman Chemical Company), and aliphatic modified rosin resins (e.g., maleic anhydride modified rosin resins marketed as LEWISOL 28-M or LEWISOL 29-M).

Examples of aliphatic hydrocarbon resin tackifiers include tackifiers derived from liquid C5 feedstock by Lewis acid catalyzed polymerization, and hydrogenated derivatives thereof. Commercially available aliphatic hydrocarbon resin tackifiers include those marketed by Eastman Chemical Company, Kingsport, Tenn., under the trade designations PICCOTAC 1020, PICCOTAC 1095, PICCOTAC 1098, PICCOTAC 1100, and PICCOTAC 1115, and in hydrogenated forms as EASTOTAC H-100E, EASTOTAC H-115E and EASTOCTAC H-130E.

Liquid natural rubber is a modified form of natural rubber with a shorter polymeric chain. Many liquid natural rubbers are commercially available. Examples include liquid natural rubbers marketed by DPR industries, Coatesville, Pa., under the trade designations DPR 35, DPR 40, DPR 75, and DPR 400.

Hydrogenated polybutadienes are available commercially; for example, as KRATON LIQUID L1203 from Kraton Polymers US LLC, Houston, Tex., and as POLY-TAIL from Mitsubishi International Polymer/Trade Corporation, Newark, N.J. Polytetramethylene ether glycol (PTMEG) is a waxy, white solid that melts to a clear, colorless viscous liquid near room temperature. PTMEG is produced by the catalyzed polymerization of tetrahydrofuran. Exemplary polytetramethylene ether glycols include those available under the trade designation TETRATHANE from Invista, Waynesboro, Va. (e.g., TETRATHANE 250, 650, 1000, 1400, 1800, 2000 and 2900). Useful copolymers of isooctyl acrylate and acrylic acid are described in U.S. Pat. No. 4,418,120 (Kealy et. al). Examples include copolymers of isooctyl acrylate (IOA) and acrylic acid (AA) wherein the weight ratio of IOA:AA is in the range of from 93:7 to 97:3; more preferably abut 95:5.

Useful aliphatic zwitterionic amphiphilic acrylic polymers are described in U.S. 2014/0170362 A1 (Ali et al.). Examples of useful zwitterionic amphiphilic acrylic polymers include the polymerized product of an anionic monomer that is acrylic acid, methacrylic acid, a salt thereof, or a blend thereof; an acrylate or methacrylate ester of an alcohol having between 8 and 12 carbons; and a cationic monomer that is an acrylate or methacrylate ester having alkylammonium functionality. Optionally, one or more additional monomers are included in the zwitterionic polymers of the invention. In some embodiments the anionic monomer is acrylic or methacrylic acid, the acid is converted either before or after polymerization to a corresponding carboxylate salt by neutralization. In some embodiments, the acrylic acid, methacrylic acid, or a salt thereof is a mixture of two or more thereof. In some embodiments, the acrylate or methacrylate ester is a mixture of two or more such esters; in some embodiments, the cationic monomer is a mixture of two or more such cationic monomers.

In some embodiments, the polymerized product of acrylic acid, methacrylic acid, a salt thereof or blend thereof is present in the zwitterionic polymer at about 0.2 wt % to 5 wt % based on the total weight of the polymer, or at about 0.5 wt % to 5 wt % of the zwitterionic polymer, or in various intermediate levels such as 0.3 wt %, 0.4 wt %, 0.6 wt %, 0.7 wt %, and all other such individual values represented by 0.1 wt % increments between 0.2 and 5.0 wt %, and in ranges spanning between any of these individual values in 0.1 wt % increments, such as 0.2 wt % to 0.9 wt %, 1.2 wt % to 3.1 wt %, and the like.

In some embodiments, the acrylate or methacrylate ester of an alcohol having between 8 and 12 carbons includes acrylate or methacrylate esters of linear, branched, or cyclic alcohols. While not intended to be limiting, examples of alcohols useful in the acrylate or methacrylate esters include octyl, isooctyl, nonyl, isononyl, decyl, undecyl, and dodecyl alcohol. In some embodiments, the alcohol is isooctyl alcohol. In some embodiments, the acrylate or methacrylate ester of an alcohol having between 8 and 12 carbons is a mixture of two or more such compounds. In some embodiments, polymerized product of the acrylate or methacrylate ester of an alcohol having between 8 and 12 carbons is present in the zwitterionic polymer at about 50 wt % to 95 wt % of the total weight of the polymer, or at about 60 wt % to 90 wt % of the total weight of the polymer, or at about 75 wt % to 85 wt % of the total weight of the polymer, or in various intermediate levels such as 51 wt %, 52 wt %, 53 wt %, 54 wt %, and all other such values individually represented by 1 wt % increments between 50 wt % and 95 wt %, and in any range spanning between any of these individual values in 1 wt % increments, for example ranges such as about 54 wt % to 81 wt %, about 66 wt % to 82 wt %, about 77 wt % to 79 wt. 20%, and the like.

In some embodiments, the cationic monomer is an acrylate or methacrylate ester including an alkylammonium functionality. In some embodiments, the cationic monomer is a 2-(trialkylammonium)ethyl acrylate or a 2-(trialkylammonium)ethyl methacrylate. In such embodiments, the nature of the alkyl groups is not particularly limited; however, cost and practicality limit the number of useful embodiments. In embodiments, the 2-(trialkylammonium) ethyl acrylate or 2-(trialkylammonium)ethyl methacrylate is formed by the reaction of 2-(dimethylamino) ethyl acrylate or 2-(dimethylamino)ethyl methacrylate with an alkyl halide; in such embodiments, at least two of the three alkyl groups of the 2-(trialkylammonium)ethyl acrylate or 2-(trialkylammonium)ethyl methacrylate are methyl. In some such embodiments, all three alkyl groups are methyl groups. In other embodiments, two of the three alkyl groups are methyl and the third is a linear, branched, cyclic, or alicyclic group having between 2 and 24 carbon atoms, or between 6 and 20 carbon atoms, or between 8 and 18 carbon atoms, or 16 carbon atoms. In some embodiments, the cationic monomer is a mixture of two or more of these compounds.

The anion associated with the ammonium functionality of the cationic monomer is not particularly limited, and many anions are useful in connection with various embodiments of the invention. In some embodiments, the anion is a halide anion, such as chloride, bromide, fluoride, or iodide; in some such embodiments, the anion is chloride. In other embodiments the anion is $BF_4-$, $—N(SO_2CF_3)_2$, $—O_3SCF_3$, or $—O_3SC_4F_9$. In other embodiments, the anion is methyl sulfate. In still other embodiments, the anion is hydroxide. In some embodiments, the one or more cationic monomers includes a mixture of two or more of these anions. In some embodiments, polymerization is carried out using 2-(dimethylamino)ethyl acrylate or 2-(dimethylamino)ethyl methacrylate, and the corresponding ammonium functionality is formed in situ by reacting the amino groups present within the polymer with a suitable alkyl halide to form the corresponding ammonium halide functionality. In other embodiments, the ammonium functional monomer is incorporated into the cationic polymer and then the anion is exchanged to provide a different anion. In such embodiments, ion exchange is carried out using any of the conventional processes known to and commonly employed by those having skill in the art.

In some embodiments, the polymerized product of the cationic monomer is present in the zwitterionic polymer at about 2 wt % to 45 wt % based on the total weight of the zwitterionic polymer, or at about 2 wt % to 35 wt % of the zwitterionic polymer, or at about 4 wt % to 25 wt % of the zwitterionic polymer, or at about 6 wt % to 15 wt % of the zwitterionic polymer, or at about 7 wt % to 10 wt % of the zwitterionic polymer, or in various intermediate levels such as 3 wt %, 5 wt %, 6 wt %, 8 wt %, and all other such individual values represented by 1 wt % increments between 2 wt % and 45 wt %, and in any range spanning these individual values in 1 wt % increments, such as 2 wt % to 4 wt %, 7 wt % to 38 wt %, 20 wt % to 25 wt %, and the like.

The curable tacky binder precursor material may also contain additives such as fibers, lubricants, wetting agents, thixotropic materials, surfactants, pigments, dyes, antistatic agents (e.g., carbon black, vanadium oxide, graphite, etc.), coupling agents (e.g., silanes, titanates, zircoaluminates, etc.), plasticizers, suspending agents, and the like. The amounts of these optional additives are selected to provide the preferred properties. The coupling agents can improve adhesion to the abrasive particles and/or filler. The binder chemistry may be thermally cured, radiation cured or combinations thereof. Additional details on binder chemistry may be found in U.S. Pat. No. 4,588,419 (Caul et al.), U.S. Pat. No. 4,751,138 (Tumey et al.), and U.S. Pat. No. 5,436,063 (Follett et al.).

The curable tacky binder precursor material may also contain filler materials or grinding aids, typically in the form of a particulate material. Typically, the particulate materials are inorganic materials. Examples of useful fillers for this disclosure include: metal carbonates (e.g., calcium carbonate (e.g., chalk, calcite, marl, travertine, marble and limestone), calcium magnesium carbonate, sodium carbonate, magnesium carbonate), silica (e.g., quartz, glass beads, glass bubbles and glass fibers) silicates (e.g., talc, clays, (montmorillonite) feldspar, mica, calcium silicate, calcium metasilicate, sodium aluminosilicate, sodium silicate) metal sulfates (e.g., calcium sulfate, barium sulfate, sodium sulfate, aluminum sodium sulfate, aluminum sulfate), gypsum, vermiculite, wood flour, aluminum trihydrate, carbon black, metal oxides (e.g., calcium oxide (lime), aluminum oxide, titanium dioxide), and metal sulfites (e.g., calcium sulfite).

The size layer precursor may be the same as or different than the make layer precursor. Examples of suitable thermosetting resins that may be useful for the size layer precursor include, for example, free-radically polymerizable monomers and/or oligomers, epoxy resins, acrylic resins, urethane resins, phenolic resins, urea-formaldehyde resins, melamine-formaldehyde resins, aminoplast resins, cyanate resins, or combinations thereof.

Useful binder precursors include thermally curable resins and radiation curable resins, which may be cured, for example, thermally and/or by exposure to radiation. The size layer precursor may also be modified various additives (e.g., as discussed above with respect to the make coat precursor). Catalysts and/or initiators may be added to thermosetting resins; for example, according to conventional practice and depending on the resin used.

In some embodiments, heat energy is applied to advance curing of the thermosetting resins (e.g., size layer precursor or curable tacky binder material precursor compositions according to the present disclosure). However, other sources of energy (e.g., microwave radiation, infrared light, ultraviolet light, visible light, may also be used). The selection will generally be dictated by the particular resin system selected.

The following clauses describe select embodiments of the present disclosure:

Clause 1. An abrasive particle transfer system comprising a production tool including a dispensing surface with a plurality of cavities formed therein; abrasive particles removably disposed within at least some of the cavities; and a nonwoven substrate having an outer surface opposing the dispensing surface of the production tool, wherein the dispending surface of the production tool is configured to apply a compressive force to the outer surface of the nonwoven substrate to compress the nonwoven substrate from a first thickness to a second thickness, wherein, while the nonwoven substrate is compressed to the second thickness by the production tool, the abrasive particles are transferred from the plurality of cavities to the nonwoven substrate.

Clause 2. The abrasive particle transfer system of clause 1, wherein the second thickness is less than or equal to approximately 20 millimeters.

Clause 3. The abrasive particle transfer system of any of clauses 1 and 2, wherein the first thickness is greater than or equal to approximately 50 millimeters.

Clause 4. The abrasive particle transfer system of any of clauses 1-3, wherein the second thickness ranges from approximately 5% to approximately 50% of the first thickness.

Clause 5. The abrasive particle transfer system of any of clauses 1-4, wherein the nonwoven substrate defines a substantially flat surface when the production tool applies the compressive force into the outer surface and a non-flat surface prior to application of the compressive force by the production tool.

Clause 6. The abrasive particle transfer system of any of clauses 1-5, wherein the production tool is configured release the compressive force following the transfer of the abrasive particles to the nonwoven substrate.

Clause 7. The abrasive particle transfer system of clause 6, wherein the nonwoven substrate is configured to rebound to a third thickness greater than the second thickness following release of the compressive force into the outer surface.

Clause 8. The abrasive particle transfer system of clause 7, wherein the third thickness is substantially equal to the first thickness.

Clause 9. The abrasive particle transfer system of any of clauses 1-8, wherein the nonwoven substrate comprises a plurality of fibers, wherein the plurality of fibers extend substantially parallel to the dispending surface when the nonwoven substrate is compressed to the second thickness, and at least a portion of the plurality of fibers extend in a direction non-parallel to the dispensing surface prior to being compressed from the first thickness.

Clause 10. The abrasive particle transfer system of any of clauses 6-9, wherein the abrasive particles transferred to the nonwoven substrate exhibit a pattern and particle orientation while the compressive force is applied, and wherein the transferred abrasive retain substantially a same pattern and particle orientation following the release of the compressive force applied by the production tool.

Clause 11. The abrasive particle transfer system of any of clause 1-10, wherein the nonwoven substrate includes a resin adhesive layer that adheres the abrasive particles to the nonwoven substrate.

Clause 12. The abrasive particle transfer system of clause 11, wherein the resin adhesive layer is configured such that the abrasive particles adhere to the nonwoven substrate from the production tool without substantially transferring the resin adhesive to the production tool following release of the compressive force applied by the production tool.

Clause 13. The abrasive particle transfer system of any of clauses 11 and 12, wherein the resin adhesive layer comprises a phenolic pressure sensitive adhesive.

Clause 14. The abrasive particle transfer system of any of clauses 1-13, wherein the abrasive particles are held in the plurality of cavities by application of a vacuum, wherein the vacuum is released to transfer the abrasive particles to the nonwoven substrate while the nonwoven substrate is compressed to the second thickness by the production tool.

Clause 15. The abrasive particle transfer system of any of clauses 1-14, wherein the nonwoven substrate comprises a lofty open nonwoven fiber web.

Clause 16. The abrasive particle transfer system of any of clauses 1-15, wherein the production tool is guided along a first web path and the nonwoven substrate is guided along a second web path such that the dispending surface of the production tool and the outer surface of the nonwoven substrate are contacted between adjacent transfer rollers to compress the nonwoven substrate to the second thickness.

Clause 17. A method comprising providing a production tool including a dispensing surface with a plurality of cavities formed therein, wherein abrasive particles removably disposed within at least some of the cavities; compressing a nonwoven substrate having an outer surface opposing the dispensing surface of the production tool via a compressive force applied by the production tool, wherein the nonwoven substrate is compressed from a first thickness to a second thickness; and transferring, while the nonwoven substrate is compressed to the second thickness by the production tool, the abrasive particles from the plurality of cavities to the nonwoven substrate.

Clause 18. The method of clause 17, wherein the second thickness is less than or equal to approximately 20 millimeters.

Clause 19. The method of any of clauses 17 and 18, wherein the first thickness is greater than or equal to approximately 50 millimeters.

Clause 20. The method of any of clauses 17-19, wherein the second thickness ranges from approximately 5% to approximately 50% of the first thickness.

Clause 21. The method of any of clause 17-20, wherein the nonwoven substrate defines a substantially flat surface when the production tool applies the compressive force into the outer surface and a non-flat surface prior to application of the compressive force by the production tool.

Clause 22. The method of any of clauses 17-21, further comprising releasing the compressive force following the transfer of the abrasive particles to the nonwoven substrate.

Clause 23. The method of clause 22, wherein the nonwoven substrate is configured to rebound to a third thickness greater than the second thickness following release of the compressive force into the outer surface.

Clause 24. The method of clause 23, wherein the third thickness is substantially equal to the first thickness.

Clause 25. The method of any of clauses 17-24, wherein the nonwoven substrate comprises a plurality of fibers, wherein the plurality of fibers extend substantially parallel to the dispending surface when the nonwoven substrate is compressed to the second thickness, and at least a portion of the plurality of fibers extend in a direction non-parallel to the dispensing surface prior to being compressed from the first thickness Clause 26. The method of any of clauses 22-25, wherein the abrasive particles transferred to the nonwoven substrate exhibit a pattern and particle orientation while the compressive force is applied, and wherein the transferred abrasive retain substantially a same pattern and particle orientation following the release of the compressive force applied by the production tool.

Clause 27. The method of any of clause 17-26, wherein the nonwoven substrate includes a resin adhesive layer that adheres the abrasive particles to the nonwoven substrate.

Clause 28. The method of clause 27, wherein the resin adhesive layer is configured such that the abrasive particles adhere to the nonwoven substrate from the production tool without substantially transferring the resin adhesive to the production tool following release of the compressive force applied by the production tool.

Clause 29. The method of any of clauses 27 and 28, wherein the resin adhesive layer comprises a phenolic pressure sensitive adhesive.

Clause 30. The method of any of clauses 17-29, wherein the abrasive particles are held in the plurality of cavities by application of a vacuum, wherein the vacuum is released to transfer the abrasive particles to the nonwoven substrate while the nonwoven substrate is compressed to the second thickness by the production tool.

Clause 31. The method of any of clauses 17-30, wherein the nonwoven substrate comprises a lofty open nonwoven fiber web.

Clause 32. The method of any of clauses 1-31, wherein the production tool is guided along a first web path and the nonwoven substrate is guided along a second web path such that the dispending surface of the production tool and the outer surface of the nonwoven substrate are contacted between adjacent transfer rollers to compress the nonwoven substrate to the second thickness.

EXAMPLE

Objects and advantages of this disclosure are further illustrated by the following non-limiting examples. The particular materials and amounts thereof recited in these examples as well as other conditions and details, should not be construed to unduly limit this disclosure. Unless otherwise noted, all parts, percentages, ratios, etc. in the Examples are by weight.

In the Example, representative sample abrasive nonwoven articles were prepared in accordance with some examples of the disclosure. For each sample, shaped abrasive particles were prepared according to the disclosure of U.S. Pat. No. 8,142,531. The shaped abrasive particles were prepared by molding alumina sol gel in equilateral triangle-shaped polypropylene mold. The resulting shaped abrasive particles after drying and firing were about 0.51 millimeters (base length)×0.44 millimeters (side height)×0.096 millimeters (thickness), with a draft angle approximately 98 degrees.

For each representative sample, an approximately 0.35 inches (8.89 millimeters) thick, 125 grams per square meter air laid nonwoven web was formed from 15 denier (17 decitex) nylon 6,6 staple fiber on a web forming machine available under the trade designation "RANDO-WEBBER" from the Rando Machine Corporation, Macedon, N.Y. This web was coated with a prebond resin consisting of 21.7% polyurethane prepolymer (obtained under trade designation "ADIPRENE BL-16" from Chemtura, Middlebury Conn.), 26.1% propylene glycol monomethyl ether acetate (obtained from Ashland Chemical Company, Columbus, Ohio), 3.969% aromatic amine (obtained under trade designation "LAPDX K450" from Royce International, East Rutherford, N.J.), 6% calcium carbonate (obtained under trade designation "Q325" from Huber Engineered Materials, Atlanta, Ga.), 0.1% silicone antifoam (obtained under trade designation "ANTIFOAM 1520" from Dow Corning, Midland, Mich.), 1.2% red dye (obtained under trade designation "CIBACET RED DYE 17 DISPERSE 2G" from Huntsman Textile Effects, Dalton, Ga.), and 32.6% brown aluminum oxide (obtained under trade designation "DURALUM G52", grade 280/600, from Washington Mills Electro Minerals Company, Niagra Falls, N.Y.). The prebond coating was then heated in a two-zone conveyor oven, the two zones set at 245 degrees F. (118 degrees C.) and 265 degrees F. (130 degrees C.), respectively. The resulting prebond coating dry add-on was 159 gram per square meter. The prebond web was cut into sections with size of 4 inches by 6 inches. A make coat was then coated onto a polyester liner using a 20 mil notch gap. The 4 inches by 6 inches nonwoven was then placed directly onto the 20 mil wet resin and a 4.6 kg steel panel (6"×14") was placed on top to squish the web for 5 seconds which transferred some of the resin onto the nonwoven. Afterwords, the nonwoven was removed from the coated PET liner and a roller was used to evenly disperse the coating throughout the nonwoven web. The make coating resin was consisting of 80% resole phenolic resin (a 1.5-2.1:1 (formaldehyde:phenol) condensate catalyzed with 2.5% potassium hydroxide), 10% aliphatic hydrocarbon resin (obtained under trade designation "PICCOTAC 1020" from Eastman Chemical Company, Kingsport, Tenn.), and 10% rosin ester tackifier (obtained under trade designation "AQUATAC 6085", 61% solids in water, from Arizona Chemical, Jacksonville, Fla.).

A transfer tooling, as described in PCT published patent application WO2015/100220, was utilized that held shaped abrasive particles with a predetermined pattern and orientation. Once this tooling was substantially filled with shaped particles, the excess particles on the surface of the tooling were removed by means of a brush, while a vacuum-enabled tooling, as described in PCT Patent Application WO2015/100220, prevented the correctly-positioned particles from releasing out of the tooling.

Figure 4:
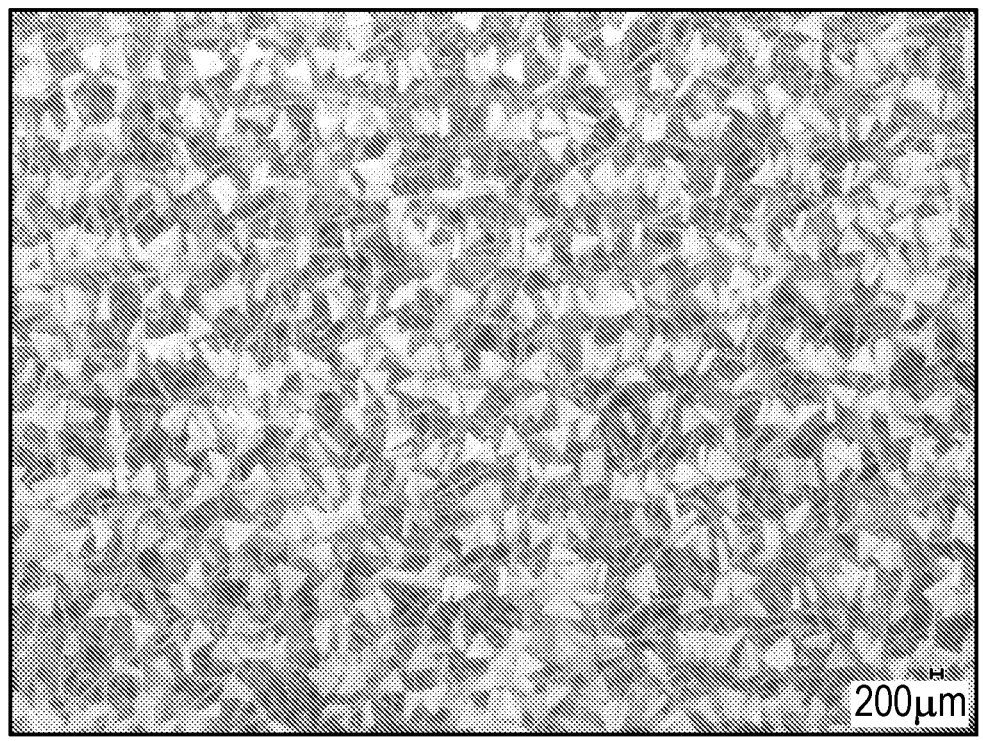
FIGS. 4-7 are photomicrographs of various sample prepared to evaluate aspects of the present disclosure.
Figure 5:
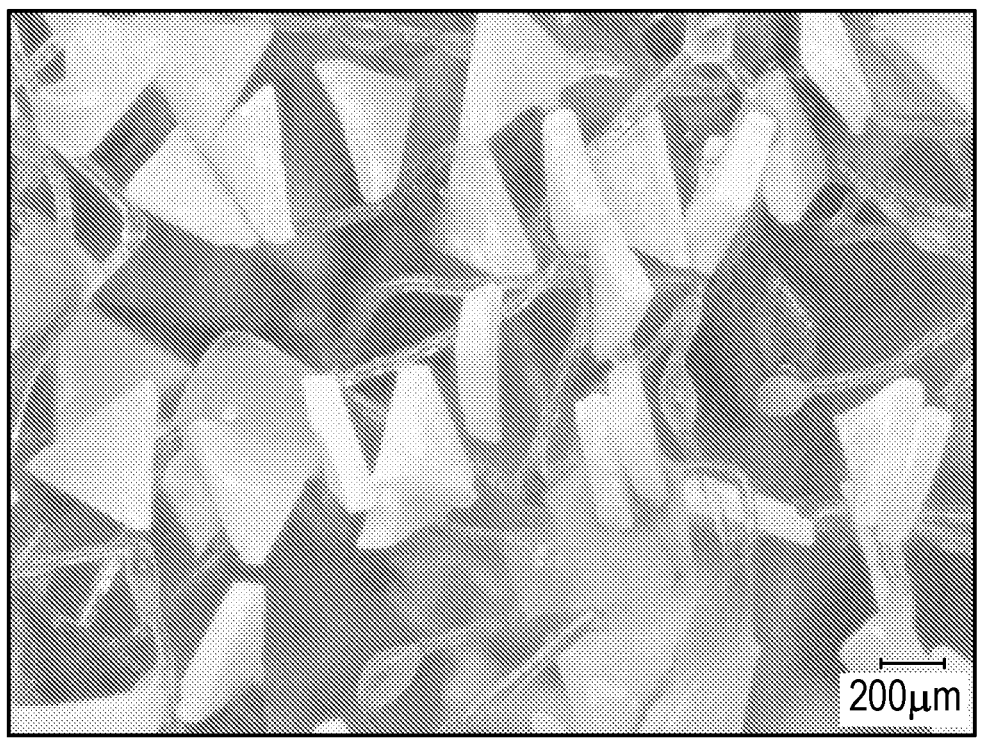

The mineral-filled tooling was then brought into contact with the tacky coated web according to the example process described above with regard to FIGS. 1A-1C. The tooling and web were urged together at about 20.7 kilopascals whereby the web was compressed to about 2.54 millimeters thick. At this point, the tooling vacuum source was turned off which allowed the particles to release from the patterned tooling. The particles adhered to the coated fibers of the web thus creating an array of patterned and oriented abrasive particles. The patterned tooling was then withdrawn from contact with the web, thus allowing the web to expand back to its initial thickness. As a result, the fibers bearing oriented and patterned particles resumed their relaxed-state position at various layers throughout the thickness of the web. Representative photomicrographs of the webs from two sample (Sample 1 and Sample 2) are shown in FIG. 4 and FIG. 5, respectively. The mineral loading weight was approximately 158 grams per square meter.

Figure 6:
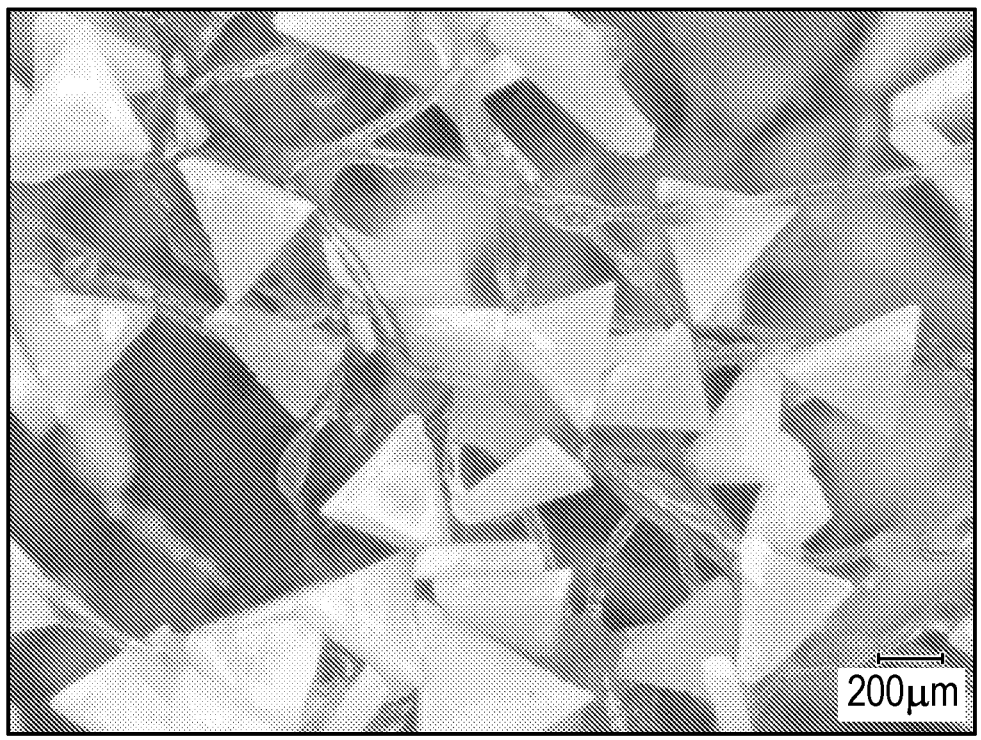
Figure 7:
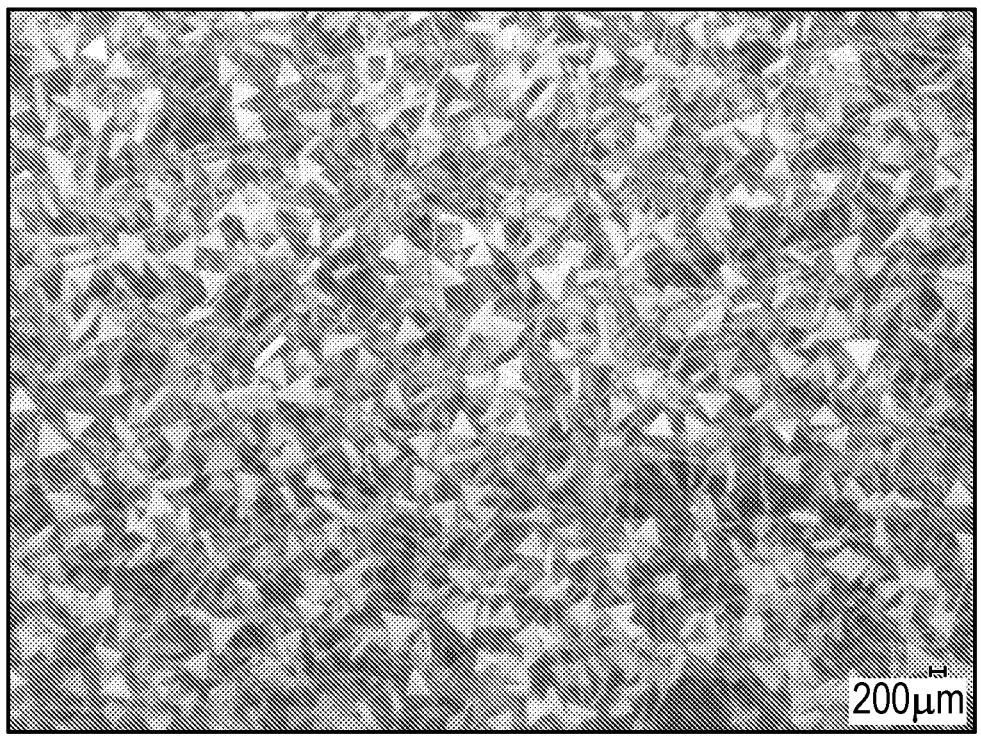

A comparative sample was also prepared along with the representative samples. After the make resin was applied, abrasive mineral was dropped onto the resin coated nonwoven from 1 inch in height. Images of the comparative sample are shown in FIGS. 6 and 7. The samples were allowed to dry for at least 12 hours prior to the size coating. A size coating was spray applied using a spray bottle which consisted of phenolic resin obtained under the trade designation "PREFERE 80 5077A" from Arclin, Mississauga, Ontario, Canada (215.6 g) and Dowanol PME solvent (170.4 g)

Schiefer Cut Test (Similar to that Described in U.S. Pat. No. 5,681,361)

This test provided a measure of the cut (i.e., the material removed from a work piece) of nonwoven abrasive articles under dry conditions. A 4-inch diameter circular specimen was cut from the abrasive material to be tested and secured by hook and loop to a back-up pad. The back-up pad was secured to the driven plate of a Schiefer Abrasion Tester (available from Frazier Precision Company, Gaithersburg, Md.). Polymethyl methacrylate discs, 4" diameter, ⅛" thick, American Cyanamid "Acrylite" with Rockwell M Ball hardness of 90-105 from Crown Plastics, Inc. Plymouth, Minn. were employed. The initial weight of each work piece was recorded to the nearest milligram prior to mounting on the work piece holder of the abrasion tester. A 5-pound load was placed on the abrasion tester weight platform and the mounted abrasive specimen was lowered onto the work piece. The machine was set to run for 100 cycles and then automatically stopped. After each 100 cycles of the test, the work piece was wiped free of water and debris and the cut weighed. The test went for 1000 total cycles. The test results are summarized in the following table:

| Schiefer Cycle No. | Comparative example | Example 1 |
| --- | --- | --- |
| 0 | | |
| 100 | 0.021 g | 0.044 g |
| 200 | 0.017 g | 0.045 g |
| 300 | 0.018 g | 0.044 g |
| 400 | 0.017 g | 0.045 g |
| 500 | 0.015 g | 0.039 g |
| 600 | 0.015 g | 0.039 g |
| 700 | 0.015 g | 0.042 g |
| 800 | 0.014 g | 0.044 g |
| 900 | 0.013 g | 0.043 g |
| 1000 | 0.013 g | 0.044 g |
| Total Cut | 0.158 g | 0.429 |

Various embodiments of the invention have been described. These and other embodiments are within the scope of the following claims.

What is claimed is:

1. An abrasive particle transfer system comprising:
   a production tool including a dispensing surface with a plurality of cavities formed therein;
   abrasive particles removably disposed within at least some of the cavities;
   a nonwoven substrate having an outer surface opposing the dispensing surface of the production tool, wherein the dispensing surface of the production tool is configured to apply a compressive force to the outer surface of the nonwoven substrate to compress the nonwoven substrate from a first thickness to a second thickness, wherein, while the nonwoven substrate is compressed to the second thickness by the production tool, the abrasive particles are transferred from the plurality of cavities to the nonwoven substrate, and
   wherein the second thickness ranges from approximately 5% to approximately 50% of the first thickness.

2. The abrasive particle transfer system of claim 1, wherein the second thickness is less than or equal to approximately 20 millimeters.

3. The abrasive particle transfer system of claim 1, wherein the first thickness is greater than or equal to approximately 50 millimeters.

4. An abrasive particle transfer system comprising:
   a production tool including a dispensing surface with a plurality of cavities formed therein;
   abrasive particles removably disposed within at least some of the cavities;
   a nonwoven substrate having an outer surface opposing the dispensing surface of the production tool, wherein the dispensing surface of the production tool is configured to apply a compressive force to the outer surface of the nonwoven substrate to compress the nonwoven substrate from a first thickness to a second thickness, wherein, while the nonwoven substrate is compressed to the second thickness by the production tool, the abrasive particles are transferred from the plurality of cavities to the nonwoven substrate; and
   wherein the nonwoven substrate defines a substantially flat surface when the production tool applies the compressive force into the outer surface and a non-flat surface prior to application of the compressive force by the production tool.

5. The abrasive particle transfer system of claim 1, wherein the production tool is configured to release the compressive force following the transfer of the abrasive particles to the nonwoven substrate.

6. The abrasive particle transfer system of claim 5, wherein the nonwoven substrate is configured to rebound to a third thickness greater than the second thickness following release of the compressive force into the outer surface.

7. The abrasive particle transfer system of claim 6, wherein the third thickness is substantially equal to the first thickness.

8. An abrasive particle transfer system comprising:
a production tool including a dispensing surface with a plurality of cavities formed therein;
abrasive particles removable disposed within at least some of the cavities;
a nonwoven substrate having an outer surface opposing the dispensing surface of the production tool, wherein the dispensing surface of the production tool is configured to apply a compressive force to the outer surface of the nonwoven substrate to compress the nonwoven substrate from a first thickness to a second thickness, wherein, while the nonwoven substrate is compressed to the second thickness by the production tool, the abrasive particles are transferred from the plurality of cavities to the nonwoven substrate; and
wherein the nonwoven substrate comprises a plurality of fibers, wherein the plurality of fibers extend substantially parallel to the dispensing surface when the nonwoven substrate is compressed to the second thickness, and at least a portion of the plurality of fibers extend in a direction non-parallel to the dispensing surface prior to being compressed from the first thickness.

9. The abrasive particle transfer system of claim 1, wherein the abrasive particles transferred to the nonwoven substrate exhibit a pattern and particle orientation while the compressive force is applied, and wherein the transferred abrasive retain substantially the same pattern and particle orientation following the release of the compressive force applied by the production tool.

10. The abrasive particle transfer system of claim 1, wherein the nonwoven substrate includes a resin adhesive layer that adheres the abrasive particles to the nonwoven substrate.

11. The abrasive particle transfer system of claim 10, wherein the resin adhesive layer is configured such that the abrasive particles adhere to the nonwoven substrate from the production tool without substantially transferring the resin adhesive to the production tool following release of the compressive force applied by the production tool.

12. The abrasive particle transfer system of claim 10, wherein the resin adhesive layer comprises a phenolic pressure sensitive adhesive.

13. The abrasive particle transfer system of claim 1, wherein the abrasive particles are held in the plurality of cavities by application of a vacuum, wherein the vacuum is released to transfer the abrasive particles to the nonwoven substrate while the nonwoven substrate is compressed to the second thickness by the production tool.

\* \* \* \* \*